US007920561B2

United States Patent
Gonda

(10) Patent No.: US 7,920,561 B2
(45) Date of Patent: *Apr. 5, 2011

(54) METHOD FOR SUPPORTING ETHERNET MAC CIRCUITS

(76) Inventor: Rumi Sheryar Gonda, Boxborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/731,944

(22) Filed: Mar. 25, 2010

(65) Prior Publication Data

US 2010/0177775 A1 Jul. 15, 2010

(51) Int. Cl.
*H04L 12/56* (2006.01)
(52) U.S. Cl. .................. 370/389; 370/392; 370/401
(58) Field of Classification Search .................. 370/389, 370/392, 400, 401, 475; 711/202
See application file for complete search history.

(56) References Cited

U.S. PATENT DOCUMENTS

| | | | | |
|---|---|---|---|---|
| 5,245,606 | A | | 9/1993 | DeSouza ................ 370/85.13 |
| 5,491,694 | A | * | 2/1996 | Oliver et al. ................ 370/455 |
| 5,535,338 | A | * | 7/1996 | Krause et al. ................ 709/222 |
| 5,617,421 | A | | 4/1997 | Chin et al. ................ 370/402 |
| 5,684,800 | A | * | 11/1997 | Dobbins et al. ................ 370/401 |
| 5,719,862 | A | | 2/1998 | Lee et al. ................ 370/355 |
| 5,790,546 | A | * | 8/1998 | Dobbins et al. ................ 370/400 |
| 5,982,741 | A | * | 11/1999 | Ethier ................ 370/201 |
| 6,016,319 | A | * | 1/2000 | Kshirsagar et al. ........... 370/410 |
| 6,104,696 | A | | 8/2000 | Kadambi et al. |
| 6,115,385 | A | | 9/2000 | Vig ................ 370/401 |
| 6,208,649 | B1 | * | 3/2001 | Kloth ................ 370/392 |
| 6,256,314 | B1 | * | 7/2001 | Rodrig et al. ................ 370/401 |
| 6,289,015 | B1 | * | 9/2001 | Warner et al. ................ 370/392 |
| 6,377,374 | B1 | | 4/2002 | Davis et al. ................ 359/128 |
| 6,850,542 | B2 | * | 2/2005 | Tzeng ................ 370/475 |
| 6,907,469 | B1 | * | 6/2005 | Gallo et al. ................ 709/238 |
| 7,031,341 | B2 | * | 4/2006 | Yu ................ 370/469 |
| 7,246,168 | B1 | * | 7/2007 | Bales ................ 709/228 |
| 7,360,086 | B1 | * | 4/2008 | Tsuchiya et al. ............. 713/168 |
| 2002/0038253 | A1 | | 3/2002 | Seaman et al. ................ 705/26 |

(Continued)

FOREIGN PATENT DOCUMENTS

EP 0891061 B1 1/1999

(Continued)

OTHER PUBLICATIONS

Texas Instruments, "TNETX15AE, Address-Lookup Device," datasheet (1997).
Japanese Office Action for Application No. 2003-531286, dated Mar. 25, 2008.

(Continued)

*Primary Examiner* — Pankaj Kumar
*Assistant Examiner* — Duc T Duong
(74) *Attorney, Agent, or Firm* — Morse, Barnes-Brown & Pendelton, P.C.; Sean D. Detweiler, Esq.

(57) ABSTRACT

An Ethernet MAC sublayer is provided for supporting Ethernet MAC circuits in an Ethernet Network. In accordance with one embodiment, an Ethernet MAC sublayer is provided for processing and setting up circuits. The MAC sublayer provides support for higher level signaling and routing applications to implement Ethernet MAC circuit functionality. The MAC sublayer provides interrupts for WAN learning and circuit setup. The MAC sublayer also provides address table entry extension to allow for usage of multiple links between nodes. The routing application is used to manage routing information, maintain a MAC to port mapping database, and manage port resources. The signaling application is used to set up and manage circuits. In accordance to various embodiments, circuits of various types and properties can be managed in the Ethernet Network.

48 Claims, 8 Drawing Sheets

U.S. PATENT DOCUMENTS

| | | | |
|---|---|---|---|
| 2002/0091921 A1 | 7/2002 | Kunzinger | 713/153 |
| 2002/0097671 A1 | 7/2002 | Doverspike et al. | 370/216 |

FOREIGN PATENT DOCUMENTS

| | | |
|---|---|---|
| JP | 10-041971 | 2/1998 |
| JP | 11-068766 | 3/1999 |
| JP | 2001-53775 | 2/2001 |
| WO | WO-00/56024 A2 | 9/2000 |

OTHER PUBLICATIONS

European Office Action for Application No. 02778355.4, dated Jan. 28, 2009.

IEEE Computer Society, "Carrier Sense Multiple Access with Collision Detection (CSMA/CD) access method and physical layer specifications," The Institute of Electrical and Electronics Engineers, Inc., 802.3, Part 3, p. 1 (2002).

IEEE Computer Society, "Media Access Control (MAC) Bridges," The Institute of Electrical and Electronics Engineers, Inc., 802.1D, Part 3, pp. v, vii, 10, 30-32 (1998).

Nortel Networks, "Ethernet User-to-network interface," Technology Bulletin, p. 1-7 (2002).

Cisco Systems, Inc, "Tag Switching", retrieved from http://www.cisco.com/univercd/cc/td/doc/cisintwk/ito_doc/tagswtch.htm 8 pages (Feb. 20, 2002).

Martini, L. et al. "Encapsulation Methods for Transport of Layer 2 Frames Over IP and MPLS Networks", retrieved from http://www.ietf.org/internet-drafts/draft-martini-l2circuit-encap-mpls-04.txt 16 pages (Nov. 2001).

McCutcheon, M. "Ipsilon IP Switch", retrieved from http://www.cs.ubc.ca/nest/dsg/tevia_files/techreport/node23.html 4 pages (Jul. 2, 1997).

Newman, P. et al. "Ipsilon Flow Management Protocol Specification for IPv4 Version 1.0", Network Working Group, retrieved from http://www.faqs.org/rfcs/rfc1953.html 15 pages (May 1996).

Perlman, R. "3.7.2 Using Extra Links" from *Interconnections: Bridges and Routers* pp. 86-94 Addison-Wesley Publishing Group (1992).

* cited by examiner

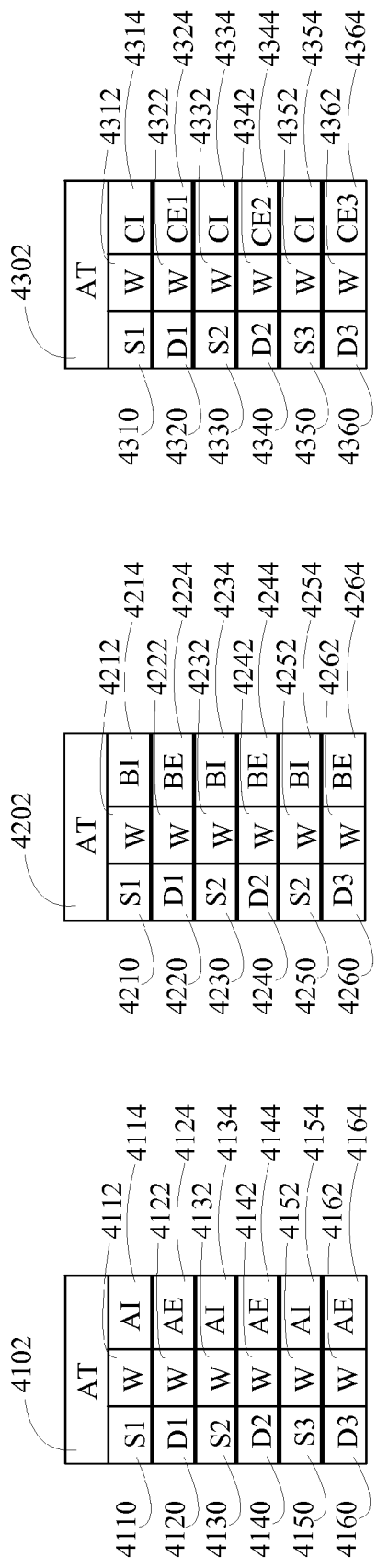

FIG. 7A

| ATA | | |
|---|---|---|
| S | W | AI |
| D | S | AE1 |
| *D* | *S* | *AE2* |
| | | |

FIG. 7B

| ATB | | |
|---|---|---|
| S | D | BI |
| D | S | BE |
| AI | W | BI |
| DE | W | BE |

FIG. 7C

| ATC | | |
|---|---|---|
| S | D | CI |
| D | S | C |
| AI | W | CI |
| DE | W | CE |

FIG. 7D

| ATD | | |
|---|---|---|
| S | D | DI1 |
| *S* | *D* | *DI2* |
| D | S | DE |
| | | |

FIG. 7E

| ATE | | |
|---|---|---|
| S | D | EI |
| D | S | EE |
| AI | W | EI |
| DE | W | EE |

FIG. 7F

| ATF | | |
|---|---|---|
| S | D | FI |
| D | S | FE |
| AI | W | FI |
| DE | W | FE |

METHOD FOR SUPPORTING ETHERNET MAC CIRCUITS

RELATED APPLICATION

This application claims priority to, and the benefit of, co-pending U.S. application Ser. No. 10/254,963, filed Sep. 24, 2002, which itself claims priority to, and the benefit of, Provisional Application No. 60/324,847, filed Sep. 24, 2001, for all subject matter contained therein. The disclosures of said applications are hereby incorporated by reference in their entirety.

FIELD OF THE INVENTION

The present invention relates generally to network switching architecture and more specifically to supporting circuits or frame flows on Ethernet configured networks.

BACKGROUND OF THE INVENTION

Currently, most Metropolitan Area Networks (MAN) and Wide Area Networks (WAN) are Time Division Multiplexing (TDM) Synchronous Digital Hierarchy (SDH) or Synchronous Optical Networks (SONET) based. In Local Area Networks (LAN) most networks are Ethernet based.

SDH/SONET (Synchronous Digital Hierarchy/Synchronous Optical Network) standards evolved originally for use in a voice network. SDH is a European version of a standard that is substantially the same as the SONET standard developed in North America. SDH/SONET contains connection oriented synchronous TDM circuit switching technology. The SDH/SONET configured network runs at the same clock domain (e.g., every section of the network can be traced to a primary clock reference). The network allocates fixed bandwidth time slots for each circuit. The SDH/SONET architectures are connection based protocols in that there is a physical circuit arrangement between ports in a switch to establish an end to end path. The digital transitions in signals traveling through an SDH/SONET network occur at the same rate, however there may be a phase difference between the transitions of any two signals caused by time delays or jitter in the transmission system.

Ethernet evolved primarily as a data network. In contrast to SDH/SONET, Ethernet is a connectionless asynchronous Carrier Sense, Multiple Access with Collision Detection (CSMA/CD) packet switching technology. The Ethernet architecture does not rely on a single clock domain like the SDH/SONET architecture. The Ethernet architecture sends a series of packets across the network containing data. Whenever a packet needs to be sent, the transmitter will try to transmit the packet. The Ethernet architecture is also connectionless in that the packets travel from node to node within the network without establishing a logical or physical circuit. The end to end path is discovered through a process called "bridging". Ethernet is fundamentally a Local Area Network (LAN) technology.

SDH/SONET networks provide reliable, guaranteed available bandwidth, low jitter connections. These characteristics are required for voice quality networks. SDH/SONET, however, is bandwidth inefficient and has a higher overhead than many other network architectures. Ethernet networks, in contrast, provide lower reliability best effort delivery, and low cost bandwidth connections. These characteristics are suitable for data quality networks. Ethernet networks have non-guaranteed transmission and low overhead, and support fewer operational functions than SDH/SONET. In SDH/SONET, once the circuit is established, bandwidth is allocated for an application and cannot be used by any other application, even if the original application is not using the bandwidth. In Ethernet, applications only use bandwidth when they need the bandwidth to transmit packets.

In order to appreciate operation of the illustrative embodiments described herein, it is helpful to understand the Open Systems Interconnect (OSI) network hierarchy, which views a network as being composed of several hierarchical layers. In the hierarchy, Layer 1 is the physical layer containing elements that perform the transmission of signals within the network. Layer 2 is the data link layer, which provides services that allow direct communication between devices across the underlying physical channel of Layer 1. Layer 3 is the network layer, which is responsible for station-to-station data delivery over multiple data links. The network layer is responsible for the routing of packets across the network. Layer 4 is the transport layer, which provides an error-free, sequenced, guaranteed delivery, message service that allows process to process communication between stations on a network. Layer 5 is the session layer, which deals with the establishment of communications between applications. This layer is useful for security applications. Layer 6 is the presentation layer, which enables the sharing of data between networked systems using different methods of local data representation. Finally, Layer 7 is the application layer. This layer provides generic application functions, such as email, file transfer capability, and the like.

Currently, Ethernet networks do not support the concept of establishing circuits. Ethernet networks use bridging algorithms to flood and learn how to forward an Ethernet frame from a source station to a destination station. STP is a protocol wherein bridges determine, establish, and maintain a topology without loops that includes every reachable link in a catenet (a collection of networks interconnected at the data link layer). In contrast, SDH/SONET networks use manual or automated provisioning with various routing and signaling protocols and algorithms in higher layers to establish circuits between two TDM endpoints.

In the LAN/Ethernet data networking world, several features have evolved to simplify network management. Many of these features can be beneficial in the LAN environment, but have disadvantages in the WAN environment. A common feature is plug-and-play, i.e., the automatic configuration of components when connected to a system or network. Spanning Tree Protocol (STP) breaks all loops in the network by only allowing one path between stations. This means that all other links are inactive and hence bandwidth is wasted. Bandwidth is also relatively plentiful in LAN/Ethernet networks. An Ethernet frame from a source station to an unknown destination station is forwarded by flooding, which is also a waste of bandwidth. Again, bandwidth is relatively less costly and more plentiful in LANs. Restoration times for equipment/link failure are relatively long, i.e., on the order of seconds. The assumption in data networking is that in the transmission of data, applications are not as time sensitive as in voice networking and the upper layers will take care of recovery by re-transmitting. This means that fast recovery is not essential for data networking.

In the MAN/WAN/SDH/SONET world the opposite is true. Users demand full control of their network and hence want to provision all circuits using Signaling algorithms. Bandwidth is not plentiful, and is costly, in MAN/WAN. Therefore, all of the bandwidth for each link should be utilized as completely as possible. Routing algorithms discover or learn the path from a source station to a destination station. The Layer 3 routing algorithms are relatively more bandwidth efficient than the flooding approach of the Layer 2 Ethernet MAC bridging algorithm. Restoration time for equipment failure/line recovery in the SDH/SONET world is specified to be quick, i.e., less than 50 msec. In the voice world, i.e, SDH/SONET, applications are highly time sensitive and, hence, lower layers perform failure recovery of equipment/line because they have a faster react time.

SUMMARY

There is a need for establishment an management of circuits in an Ethernet Network. The present invention is directed toward further solutions to address this need. A Medium Access Control (MAC) hardware device for supporting MAC circuit functionality is provided. The device includes a MAC sublayer, wherein the MAC sublayer generates an interrupt when a Ethernet frame of unknown source and/or destination MAC address is received. A plurality of Address Table (AT) entries having at least a destination MAC address field, a source MAC address field, and port to forward frame to field are also provided. At least one of the destination MAC address field and the source MAC address field is utilized to lookup at least one of an Ethernet frame destination MAC address and an Ethernet frame source MAC address and forward the Ethernet frame to a port in one of the plurality of AT entries. In accordance with one aspect of the present invention, the MAC sublayer provides a hardware interface and a software interface configurable in at least one of LAN and WAN modes to mask, generate, and process interrupts, add and remove AT entries.

In accordance with one aspect of the present invention, in an Ethernet protocol network having a source station, a destination station, and at least one node having at least two ports, a method of setting up a circuit is provided. The method includes transmitting a frame from the source station and the destination station. The frame is received on at least one port of the at least one node. Source addresses to port mapping relating to the frame received on the at least one port are learned. A destination address and a source address of the frame are used to find a path from the source station to the destination station. The path is used to set up a circuit between the source station and destination station. A plurality of Ethernet frames is then forwarded along the circuit.

In accordance with another aspect of the present invention, the step of learning can further include receiving the frame having the source addresses to port mapping at an ingress port generating an interrupt at a MAC layer. The interrupt is processed and a request is queued to a higher layer routing application. The higher layer routing application stores the source addresses to port mapping in a mapping database.

In accordance with further aspects of the present invention, the step of learning includes storing the source addresses to port mapping in a mapping database. The step of storing includes placing the source addresses to port mapping in a centralized database or a distributed database.

In accordance with further aspects of the present invention, the step of the higher layer signaling application using the path provided by the higher layer routing application to set up address table entries includes adding an AT entry with at least a destination MAC address field, a source MAC address field, and a port to forward to field as derived from the frame and the at least one port. Further, forwarding a plurality of Ethernet frames along the circuit includes forwarding the plurality of Ethernet frames through a plurality nodes in route to the destination station. The circuit can utilize multiple links between nodes. The Ethernet frames are multicast frames and forwarding the plurality of Ethernet frames comprises sending the plurality of frames to at least one of all circuits having a matching source address to the frames and all ports having active circuits. The circuit is provided between two Ethernet LANs, or a single Ethernet LAN to a plurality of Ethernet LANs, wherein the circuits have at least partially same path. The execution of path Automatic Protection Switching (APS) during circuit setup can also be provided. In addition, the circuit can be automatically set up, and the method further include receiving implicit circuit setup requests based on at least one of a destination MAC address and a source MAC address, and receiving an explicit call request using a standard interface.

In accordance with another aspect of the present invention, in an Ethernet protocol network, a method of setting up a circuit includes providing the network having a source station, a destination station, and at least one node having at least one port. Frames are transmitted from the source station. The frames are received on the at least one port of the at least one node. Destination and source addresses for port mapping relating to the frames are learned. The destination and source addresses are stored to create the circuit. The step of storing can include recording the destination and source addresses in a look-up table, a centralized database, or a distributed database.

In accordance with further aspects of the present invention, the step of learning further includes providing at least one of MAC addresses and ports at endpoints for a hop of the network. The step of learning can also include providing at least two of endpoint MAC addresses and endpoint ports.

Alternatively, the step of learning can include receiving an Ethernet frame having an unknown source address at an ingress port generating an interrupt at the MAC layer. A higher layer routing application utilizes the source address to receive port mapping constructs, and stores the MAC to port mapping constructs. The frame is forwarded to the destination station. Transmitting frames can include transmitting multicast Ethernet frames and further comprises sending the frames to at least one of all circuits having a matching source address and all ports having active circuits.

In accordance with another aspect of the present invention, in an Ethernet protocol network, a method of transmitting frames using an Ethernet MAC circuit includes providing a source station. The source station creates a frame having a destination MAC address (DMA) and a source MAC address (SMA), in addition to the frames being transmitted. The source station forwards the frame to a node. The node identifies the DMA and the SMA and forwards the frame to at least one of a second node in route to a destination station identified by the DMA and the destination station. Forwarding the frame to a node can include sending the frame to a port of the node. Forwarding the frame can further include forwarding through a plurality nodes in route to the destination station.

In accordance with another aspect of the present invention, in a network, an Ethernet MAC circuit for transporting data can include a source station, a destination station, and at least one node having at least one port, the at least one node communicatively linking the source station with the destination station. The at least one node can support storage for storing destination and source addresses for port mapping relating to the data.

In accordance with further aspects of the present invention, the storage includes a look-up address table, a centralized database, or a distributed database. The storage can store MAC addresses or ports at endpoints for a hop of the network.

The storage can also store at least two of endpoint MAC addresses and endpoint ports. The circuit can be provided between two Ethernet LANs.

BRIEF DESCRIPTION OF THE DRAWINGS

The aforementioned features and advantages, and other features and aspects of the present invention, will become better understood with regard to the following description and accompanying drawings, wherein:

FIGS. 4A, 4B, and 4C illustrate address tables on each node for a circuit tunneling Ethernet MAC link circuit setup according to one embodiment of the present invention;

FIGS. 7A, 7B, 7C, 7D, 7E, and 7F illustrate address tables on each node for a path APS protected Ethernet MAC circuit setup according to one embodiment of the present invention.

DETAILED DESCRIPTION

Figure 1:
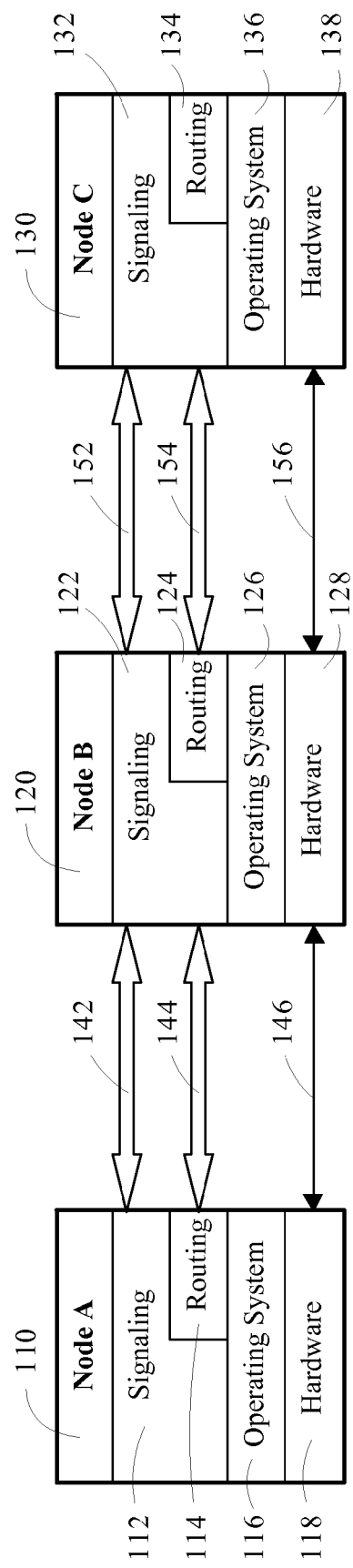
FIG. 1 illustrates control plane architecture for circuit management according to one aspect of the present invention.

The line between data traffic networks and voice traffic networks is increasingly blurring. There are more applications of voice traffic transmitted over data networks, and, thus, more demand for data networks to support voice network functionality. In data and LAN networking, Ethernet is a known technology. In voice and MAN/WAN networking SDH/SONET is a known technology. For Ethernet to be viable in the MAN/WAN network, methods are required for providing ways to provision circuits on Ethernet networks. The provision of circuits on Ethernet networks make it possible for a single, seamless, multi-service network to exist. Circuits also allow the network to be controlled in a managed way.

An Ethernet MAC (Medium Access Control) circuit can be defined as a flow of Ethernet frames between two end stations/nodes addressed by their Ethernet source MAC addresses (SMA) and destination MAC addresses (DMA). The flow of frames can traverse several intermediate stations/nodes (bridges/switches/routers) connected via links. These links can be physical and/or logical Ethernet links, An example of a logical link is an aggregated link. The links can also be SDH/SONET links. The links are not restricted to these technologies. Ethernet MAC circuits can be unidirectional or bi-directional, be unprotected or protected, or have other properties similar to an SDH/SONET circuit following the SDII/SONET standard. Circuits can be manually, semi-automatically, or automatically provisioned.

Ethernet MAC circuits are virtual circuits. Contrarily, SDH/SONET circuits are physical circuits. Physical circuits have direct connections specified in the nodes between the links. Virtual circuits have logical connections specified in the nodes between the links. In Ethernet, the present invention uses the Source MAC Address (SMA), Destination MAC Address (DMA), and port mapping of the Port to forward the frame and provide the logical connections. In SDH/SONET, the source TDM slot and destination TDM slot provide the physical connection.

The present invention provides a way to efficiently establish Ethernet MAC circuits between a source station and a destination station. Ethernet is a packet switching technology and is connectionless. SDH/SONET is a circuit switching and connection oriented technology. In order to support connections/circuits on Ethernet, technologies are required that allow the establishment of a route from source to destination, as well as the establishment of circuits at a higher layer.

A Signaling Layer is used to manage the circuits. A signaling application request the route/path from the routing application. Once the path is given to the signaling application the signaling application uses the information to establish the circuit by communicating to the signaling application of the next node in the path. This process iterates through all the nodes in the path until the end node is reached. There are several connections/circuits mapping/signaling protocol technologies that can be used, such as Multiprotocol Label Switching (MPLS), Differentiated Services (DiffServ), Integrated Services (IntServ) and Resource Reservation Setup Protocol (RSVP).

A Routing Layer is used to manage routing information. There are several routing protocol technologies that can be used in conjunction with aspects of the present invention, such as Routing Information Protocol Version 1 (RIP1), Routing Information Protocol Version 2 (RIP2), Open Shortest Path First (OSPF), Interior Gateway Routing Protocol (IGRP) and Extended Interior Gateway Routing Protocol (EIGRP).

In accordance with aspects of the present invention, the Routing Layer is used to discover the route/path between the two ports having the two end stations. To set up MAC circuits, a MAC to port mapping database is maintained. The MAC to port mapping database can also be maintained by the Routing Layer. Accordingly, the standard routing application is extended to be used as a database application as well. Most routing applications require database features to support routing. The same database functionality can be utilized for the MAC to port mapping database. The MAC to port mapping database can be centralized or distributed, based on the application, but is not restricted to only centralized or distributed arrangements. The MAC to port mapping can also be implemented by a separate mapping application. It should be noted that the routing application database can also be used to manage port resources such as bandwidth of interface, bandwidth consumed by circuits, VPN, QoS and other port attributes or properties.

In accordance with aspects of the present invention, a higher layer signaling application utilizes a path provided by user configuration, or a routing application, to establish a circuit/connection/flow by causing each node along the path to learn the destination MAC address (SMA), source MAC address (DMA) and port to forward to by placing the addresses in an Address Table (AT) entry of that node. The AT contains the entries which contain the DMA and SMA addresses and the port to which the frame is forwarded via port mapping. The port mapping is used by the switch to forward or relay the frames through a switch node. A MAC address is a bit string that uniquely identifies one or more devices or interfaces as being the source or the destination of a transmission, such as a transmitted frame.

The current MAC Bridge IEEE 802.1D Standard provides a formal description of transparent bridge operations. In LAN mode, Ethernet MAC flows are created and removed as bridging establishes path and traffic flow between end stations. Standard transparent LAN bridging or switching operations include functions such as learning, lookup, aging, and STP. Following is a brief description of how the Bridging works.

Learning is the process in which a new Address Table (AT) entry is created associating the SMA of incoming frames and the incoming port. Lookup is the process of comparing the DMA of incoming frames to decide to which outgoing port the frame is forwarded. Aging is the process by which AT entries can be removed from the table at regular timeouts so that the stale entries can be removed and the AT entry can be reused.

During the lookup process, if an AT entry for the DMA is found, the frame is forwarded to the outgoing port. If the outgoing port and the incoming port are the same, the frame is filtered, because the two stations are on the same LAN. Filtering is the process of discarding a frame either due to the preceding reason or for some user-defined criteria, such as security. If in the lookup process no AT entry for the DMA is found, flooding occurs. Flooding is the process of forwarding unknown DMA frames to all ports in the switch except the incoming port. The goal of flooding is that eventually the frame reaches the DMA end station. At this point, the forward traffic flow has been established. The destination end station's frame establishes the reverse traffic flow in the same way, i.e., utilizing the lookup and learning (bridging) processes. When the forward and reverse traffic flow has been established, a bi-directional traffic flow of LAN Ethernet traffic has been established.

Because the lookup process uses flooding to establish the path to the destination end station, the network cannot maintain loops between stations/nodes. Loops cause frame duplication and AT non-convergence. Flooding is also wasteful of bandwidth. To remove loops from the network, the standard defines an automatic loop resolution method called Spanning Tree Protocol (STP). At a high level, STP identifies one node as a root node. There is only one active path from the root bridge node to each of the other bridge nodes. This is achieved using bridge identifiers, port identifiers, link costs, and path costs. The other links between the nodes are disabled and hence, their bandwidth cannot be used. The disabled links remain in standby and can be used in the instance of active link failure as a protect link. STP has a timeout on the order of seconds for recovery from a failed link to a protect link.

Multicast in LAN Ethernet Bridging is supported in legacy switches by flooding the multicast frame. Multicast frames are distinguished by having a destination address belonging to the multicast address space set aside by IEEE 8012.1D bridging standard.

According to the standard, the first bit of the first byte/octet of the Ethernet 48-bit LAN MAC address is set to 1. Source addresses are always unicast. The IEEE 802.1D MAC Bridging standard was revised to provide for a more efficient way of supporting multicast by standardizing a multicast address registration protocol GARP Multicast Registration Protocol (GMRP). Generic Attribute Registration Protocol (GARP) is also a standardized protocol. The stations that wish to receive a particular multicast address must register this declaration on the LAN. Switches and bridges receive this declaration and set themselves up to forward any multicast with the registered multicast address to the port where the declaration was received. The switches, in turn, propagate all the registered multicast addresses by making another declaration. The effect is that multicast frames are only forwarded to the ports that need them, and not flooded as with legacy switches.

It is possible to break loops and setup paths by disabling bridging and manually configuring bridges in the network. To prevent the process from being tedious to manage, error prone, and from having to be manually maintained whenever there are configurations changed, the process was automated and the bridging standards eventually evolved to allow for interoperability between vendors.

In the current WAN environment, due to the assumptions and previously mentioned characteristics, and due to the WAN style of provisioning by end users, the current LAN MAC Bridging IEEE 802.1D standard cannot be used to setup Ethernet MAC circuits. Note that aspects of the present invention do not preclude the concurrent existence of LAN mode and WAN mode MAC circuits in the networks. This will be referred to as Dual mode (LAN and WAN).

Following is a description of aspects of the present invention directed to how Ethernet MAC circuits are set up and function. When an Ethernet frame (i.e., the data link layer encapsulation of Ethernet data—Layer 2) with unknown destination and/or source MAC address is received on a port, the Routing layer (network layer—Layer 3) is used to learn the destination and source MAC addresses, and the port one which it was received for MAC to port mapping by storing the mapping in a mapping database. This is known as WAN learning.

To support SDH/SONET ports on a switch that has an Ethernet MAC circuit as described above, it is assumed that there is an SDH/SONET port and TDM slot to Ethernet MAP mapping. For SDH/SONET ports, a mapping of TDM ports and slots to a unique MAC address is defined in hardware or software. These MAC addresses are then used to establish a MAC circuit. It is also assumed that the SDH/SONET packets are transformed to Ethernet through encapsulation, tunneling, or translation.

In the case of manual provisioning, circuits can be established by providing both MAC addresses and/or ports (both Ethernet and SDH/SONET) at the endpoints and ports to connect for each node along the path. In this case, the user or higher level application, such as a configuration manager, provides the full path to the signaling application. An operator previously configures the end to end hop by hop path of the circuit manually, using a high level management application, which is placed into the configuration database using the configuration manager application.

In the case of semi-automatic provisioning, circuits can be established by providing just two endpoint MAC addresses and/or ports. In this case the routing application provides the remainder of the path to the signaling application, which then sets up the circuit.

In the case of automated provisioning, when an Ethernet Frame is received at an ingress port, if there is no AT entry for the corresponding DMA and SMA, the MAC layer generates an interrupt. An interrupt handler processes the interrupt and queues a circuit call setup request to the higher layers. The higher layer signaling application requests the route/path from the routing application, which utilizes the source and destination MAC addresses (SMA and DMA) to find a route between the two endpoints. Given the route, the signaling application can then set up the circuit. An explicit call request using standards such as Optical Internetworking Forum (OIF) User Network Interface (UNI) 1.0 Signaling Specification can also be used to provision automatic circuits.

It should be noted that the present invention can support any combination of the above provisioning methods. That is the circuit path can be provided as a series of manual, semimanual, or automatically provisioned paths. In addition, there is no restriction on the simultaneous use of LAN mode (LAN learning and STP) with WAN mode (WAN learning, routing and circuit setup).

Circuits can have several states. An administrative state "up" means the circuit has been configured to an "up" state. In an "up" state, the circuit is fully established, all the resources needed are allocated, and traffic can flow through. An administrative state "down" means the circuit has been configured to a "down" state. In a "down" state, the circuit is configured, the resources are de-allocated, and no traffic flows through. The circuit can be set to a disabled state. In disabled state the circuit is configured, all the resources needed are allocated, and traffic does not flow through.

The circuit can also have various protection modes configured. Protection modes can be configured to include link restoration, path restoration, and reroute. Based on the WAN mode and protection mode configuration, the circuit provides the appropriate restoration response. Circuits can also have other attributes such as, cost, bandwidth requirements, VPN, QoS requirements, and the like.

The WAN mode can be configured to be in "off", "on", "manual", "semi-automatic", or "automatic" states. In the "off" state, no configured MAC circuits are set up. In the "on" state and "manual" or "semi-automatic" states, configured circuits are set up. In the "automatic" state, when an unknown MAC address is received, the SMA is learned. The learning process triggers signaling to set up the circuit. If the DMA has also been learned at the destination end, routing determines the path between the two stations to set up the circuit.

Circuits set up can be torn down to release the resources they have consumed. In the cases of manual provisioning and semi-automatic circuits, the circuit can be de-provisioned. In the case of automatically provisioned circuits the circuit can be torn down when either the source port or destination end port of the circuit detect a link failure. Automatically provisioned circuits can also be released based on aging. In WAN mode the aging timeout is relatively longer than the aging timeout in LAN mode. The tear down process is the reverse of the circuit setup process. The Address Table entries related to the circuit are invalidated. The bandwidth and other resources are released and any other billing and statistical bookkeeping associated with the circuit can be completed. As with the circuit set up, the circuit tear down can be implemented on a hop-by-hop basis.

FIGS. 1 through 7F, wherein like parts are designated by like reference numerals throughout, illustrate example embodiments of the support of circuits or frame flows on Ethernet configured networks according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

For the Ethernet MAC hardware to support Ethernet MAC Circuits, the Ethernet MAC hardware has to support configurable options to enable/disable STP; enable/disable learning; enable/disable flooding; enable/disable aging; and allow add and remove AT entries. It should be noted that most of these options are configurable in existing hardware components. If not the MAC hardware must be extended to implement the software interfaces to support these operations.

In accordance with aspects of the present invention, in WAN mode, the Ethernet MAC hardware extends to provide support to generate an interrupt when a lookup on a DMA and/or SMA in the AT fails. This interrupt is maskable. When a lookup fails, the MAC hardware also places the SMA and DMA of the frame in corresponding registers. Standard Ethernet AT entries have several fields, such as a MAC address field, a port to forward the frame field, an aging field, and the like. In conventional Ethernet protocol, the MAC address field is loaded with the source MAC address of the frame received, and the port is loaded using the port on which the frame was received. To support MAC circuits, as defined by the present invention, the hardware AT also extends to maintain a mapping of the DMA and SMA to the port to which the frame is forwarded, The DMA is loaded from the destination MAC address field of the received frame, the SMA is loaded from the source MAC address field of the received frame, and the port is loaded using the port on which the frame was received, For purposes of this description, when the MAC address has a value symbolized with the character "W", i.e., wildcard, the SMA is not needed and can be ignored during the search match process.

In a fully circuit controlled WAN network, it can be assumed that a circuit will be defined for all end stations that need to communicate with each other. In such a case, multicast traffic can be supported as follows. When a multicast frame is received, the multicast frame is forwarded to all ports for which the source address field in the MAC address table matches the source address field of the Ethernet frame. The destination address of the address table is ignored. In case of an address table entry having a source address field value of wildcard "W", the frame is also forwarded to that port. Another method can include forwarding the multicast Ethernet frame to all ports that have active circuits passing through them.

It is also possible to implement the automatic creation of circuits to support the multicast traffic flows by extending GMRP application support in the MAC sublayer to invoke the higher layers. The process is similar to the support of unicast circuits, except the interrupt is triggered from the GMRP application in the MAC sublayer, and the destination address of the frame provided to the upper layers is a multicast address. The higher signaling and routing layers can be extended support multicast circuits.

FIG. 1 illustrates a control plane architecture in accordance with aspects of the present invention. There are three switch nodes, node A 110, node B 120, and node C 130. The three nodes 110, 120, and 130 are connected by physical media 146 and 156. Node A 110 has a first signaling application 112, node B 120 has a second signaling application 122, and node C 130 has a third signaling application 132. Each signaling application 112, 122, and 132, manages the circuits in the network. The signaling applications 112, 122, and 132 interface with a corresponding first routing application 114, second routing application 124, and third routing application 134. The routing applications 114, 124, and 134, manage the routing topology of the network. Both signaling applications 112, 122, and 132, and routing applications 114, 124, and 134, interface with one of a first operating system 116, a second operating system 126, and a third operating system 136. The operating systems 116, 126, and 136, manage first hardware resources 118, second hardware resources 128, and third hardware resources 138, in addition to software resources. The signaling applications 112, 122 and 132 communicate with each other using signaling protocols as represented by arrow 142 and arrow 152. The routing applications 114, 124, and 134 communicate with each other using routing protocols as represented by arrow 144 and arrow 154.

In WAN mode MAC circuit setup, STP and flooding operations are disabled. The path from the source to the destination can be manually configured or automatically determined using standard WAN Routing Protocols, e.g., OSPF (IETF RFC2328). The standard WAN Routing Protocol has been extended to support MAC to port mapping and port attributes and resource management. Once the path is determined, standard signaling protocols, such as MPLS (IETF RFC3031) allow the stations/nodes along the path to learn the SMA and DMA by explicitly placing these MAC address to port mapping entries into the MAC hardware using the software interface provided by MAC chips to add static entries in the address table. The upper layers also allow for support of Virtual Private Network (VPN) functionality, similar to the Virtual LAN (VLAN) functionality in 802.1Q standard. The upper layers can also provide for path level protection.

Figure 2:
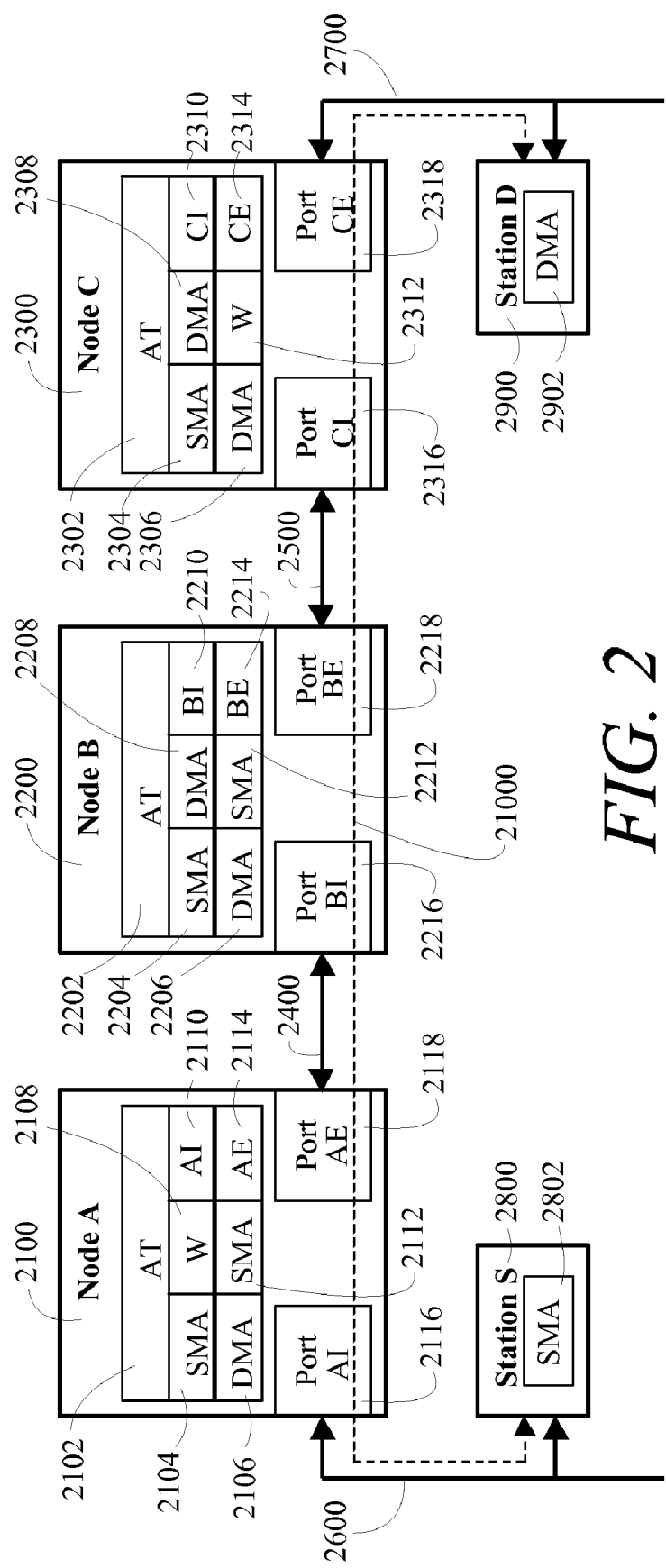
FIG. 2 is a diagrammatic illustration of an Ethernet MAC circuit setup according to one embodiment of the present invention.

FIG. 2 shows an Ethernet MAC circuit setup in a data plane. The figure shows a MAC circuit 21000 setup between a source station S 2800 and a destination station D 2900. The circuit 21000 routes through three switch nodes, node A 2100, node B 2200, and node C 2300, which are connected by physical media 2400 and 2500. The source station S 2800 is on a first Ethernet segment 2600 and has a MAC address SMA 2802. The destination station D 2900 is on a second Ethernet segment 2700 and has a MAC address DMA 2902. The first Ethernet segment 2600 is connected to node A 2100 at ingress port AI 2116. Egress port AE 2118 of node A 2100 is connected to ingress port BI 2216 of node B 2200. An egress port BE 2218 of node B 2200 connects to node C 2300 at ingress port CI 2316. An egress port CE 2318 at node C 2300 is connected to the second Ethernet segment 2700.

In FIG. 2, each switch node 2100, 2200, and 2300 maintains an address table (AT). A first address table 2102 is disposed in node A 2100, a second address table 2202 is disposed in node B 2200, and a third address table 2302 is disposed in node C 2300. Each of the address tables 2102, 2202, and 2302 maintains AT entries. Each AT entry contains three fields, a destination MAC address of the frame, a source MAC address of the frame, and the port to forward the frame. It should be noted that in real hardware, there are a few additional fields, such as aging and the like, that are not shown here so as to keep the description simpler to improve clarity. These fields are not directly relevant to the circuit setup.

The first address table 2102 contains two AT entries. The first AT entry contains a first field value SMA 2104, a second field value W 2108, and a third field value AI port ID 2110. The second AT entry contains a first field value DMA 2106, a second field value SMA 2112, and a third field value AE port ID 2114. The second address table 2202 contains two AT entries. The first AT entry contains a first field value SMA 2212, a second field value DMA 2208, and a third field value BI port ID 2210. The second entry contains a first field value DMA 2206, a second field value SMA 2212, and a third field value BE port ID 2214. The third address table 2302 contains two AT entries. The first AT entry contains a first field value SMA 2304, a second field value DMA 2308, and a third field CI port ID 2310. The second AT entry contains a first field value DMA 2306, a second field value W 2312, and a third field vale CE port ID 2314.

The higher layer signaling applications 112, 122, and 132 maintain the established circuit 21000, the current state and the resources, such as memory, bandwidth, and the like, allocated for the circuit 21000. The higher layer routing applications 114, 124, and 134 maintain the routing topology database. The routing applications 114, 124, and 134 also maintain the association of the source station S MAC address SMA 2802 and the destination station D MAC address DMA 2902 to the port AI 2116 and the port CE 2318 in a mapping database. This configuration allows automatic creation of MAC circuits 21000 between the SMA 2802 and the DMA 2902, as described in the following paragraphs.

In FIG. 2 when a frame is received from the source station S 2800 destined for the destination station D 2900, the frame has destination MAC address DMA 2902 and source MAC address SMA 2802. The frame can originate at what is labeled in the figure as station D 2900 as the source station, and travel to the source station of the first example, now destination station S 2800. In traveling the reverse direction to get to destination station S 2800, the frame has a destination address equivalent to SMA 2802 and a source address equivalent to DMA 2902. When frames with unknown MAC addresses are received, the node A 2100 or node C 2300 initiates a WAN learning operation. If the routing application has the port mappings for both of the MAC addresses 2802 and 2902, it determines the path to take to connect the source station S 2800 and the destination station D 2900. Once the path is determined, the signaling application initiates a circuit setup request on every node along the path. In the illustrated example, nodes A 2100, B 2200, and C 2300 receive the circuit setup request. On each of these nodes the appropriate AT entry is created by the signaling application. On node A 2100 signaling places in AT 2102 an AT entry containing values destination address SMA 2104, source address W 2108, and forwarding port ID AI 2110. Similarly, an entry containing values DMA 2106, SMA 2112, and AE 2114 is placed in AT 2102. On node B 2200 signaling places entries containing values SMA 2204, DMA 2208, BI 2210, DMA 2206, SMA 2212, and BE 2214 in AT 2202. On node C 2300 signaling places entries containing values SMA 2304, DMA 2308, CI 2310, DMA 2306, W 2312, and CE 2314 in AT 2303.

Once all the nodes have learned the path for frames to be sent between source station S 2800 and destination station D 2900, the MAC circuit 21000 has been setup and the MAC frame flow can begin. In the forward direction, when station S 2800 sends a packet destined to station D 2900, it creates a frame with destination address as DMA 2902 and source address as SMA 2802. When this packet reaches node A 2100 port AI 2116 the switch performs a lookup of the destination and source addresses in the AT 2102 for matching entries. The entry with DMA 2106 and SMA 2112 matches and the forwarding port ID is AE 2114. This causes the switch/node to forward the frame to port AE 2118. The frame then reaches node B 2200 port BI 2216. When switch/node B 2200 sees the frame it matches the entry with DMA 2206 and SMA 2212, which informs it to forward the frame to port ID BE 2214. This causes the switch/node to forward the frame to port BE 2218. From there, the frame reaches node C 2300 port CI 2316. When switch/node C 2300 sees the frame it matches the entry with DMA 2306 and W 2312 and this will inform it to forward the frame to port ID CE 2314. This causes the switch/node to forward the frame to port CE 2318, where it can reach the destination station D 2900, which will receive the frame because it had destination address DMA 2902.

In the reverse path, when station D 2900 sends a packet destined to station S 2800, station D creates a frame with destination address as SMA 2800 and source address as DMA 2900. When this packet reaches switch/node C 2300 port CE 2318 the entry with SMA 2304 and DMA 2308 matches, which indicates that the frame should be forwarded to CI 2310. This causes the switch to forward the frame to port CI 2316. The frame then reaches node B 2200 port BE 2218. When the switch/node B 2200 sees the frame, it matches the entry with SMA 2204 and DMA 2208, which indicates that the frame should be forwarded to BI 2210. This causes the switch to forward the frame to port BI 2216. From there, the frame reaches node A 2100 port AE 2118. When the switch/node A 2100 sees the frame, it matches the entry with SMA 2104 and DMA 2108, and this indicates that the frame should be forwarded to AI 2110. This causes the switch to forward the frame to port AI 2116, where it can reach the station S 2800, which receives the packet because it had destination address SMA 2802.

When the MAC circuit 21000 is manually/statically provisioned, the station S SMA 2802, the station D DMA 2902, and the full path (from node A 2100 port AI 2116, to node A 2100 port AE 2118, to node B 2200 port BI 2216, to node B 2200 port BE 2218, to node C 2300 port CI 2316, to node C 2300 port CE 2318) from one end station S 2800 to the other end station D 2900 is provided by higher layer configuration applications through end user configuration. In this case, the signaling application 112 on node A 2100 with the source endpoint at station S 2800 gets the configuration and it reserves the resources, such as memory, bandwidth, and the like, needed locally for the circuit 21000. The node A 2100 can at this point also configure the address tables by adding a forward path AT entry at the first DMA 2106, the second SMA 2112, and the AE port ID 2114 into the MAC hardware AT 2102. This can also be done later, after the resources of the full path have been established. Once the local resources have been allocated, the signaling application 112 sends the circuit setup request to the next node in the path, node B 2200. The process continues until the destination end station D 2900. On node B 2200, the forward path AT entry of the third DMA 2206, the fourth SMA 2212, and the AE port ID 2214 are added. On node C 2300, the forward path AT entry of the fifth DMA 2306, the sixth SMA 2312, and the CE port ID 2314 are added. On each node 2100, 2200, and 2300, the reverse path AT entries of the first SMA 2104, the second DMA 2108, the AI port ID 2110, the third SMA 2204, the fourth DMA 2208, the BI port ID 2210, the fifth SMA 2304, the sixth DMA 2308, and the CI port ID 2310 are also added. In case of a unidirectional circuit, only forward path entries are added. For bi-directional circuits, both forward and reverse path AT entries are added. The manually configured circuit's configuration can be stored on the source node 2100 by design. In fact, the invention does not have any restriction as to where the configuration is stored. In the case of a manually/statically configured circuit, there is no circuit rerouting for restoration when failure occurs along the circuit path. Path restoration is described later herein. Local restorations of static/manual circuits using link failure recovery techniques, such as link aggregation or APS, can occur.

The following description illustrates one example method for establishing WAN Ethernet MAC circuits automatically. The determination of when to automatically setup circuits can be made by configurations based on per node, per port, or per MAC address mode settings for WAN mode enabled instances. The MAC mode overrides the port mode, which in turn overrides the node mode. One of ordinary skill in the art will appreciate that the invention is not restricted to these conditions, and that other configuration options can be utilized. To prevent conflict between "manual" and "automatic" modes the example design allows the "manual" configuration to override the "automatic" mode, Once again, the invention is not limited to this option, any other method can be used to resolve such conflicts.

In WAN learning, when an Ethernet frame is received on node A 2100 from source station S 2800, and its DMA lookup fails, an interrupt is generated to the higher layer MAC client application. The higher layer interrupt processing then invokes the routing application 114, which updates mapping database with an entry for the station S 2800 MAC address SMA 2802 to the AI port 2116 and also generate a routing mapping database update 144. The method then invokes the signaling application 112 to try to set up a circuit. The signaling application 112 requests the available path from the source station S SMA 2802 to the destination station D DMA 2902 from the routing application 114. If a path is found, then the signaling application 112 proceeds to set up the circuit 21000 in the same process as described by the manual case. If no path is found, the signaling application 112 returns with an error. When an error occurs, signaling can continue to retry until the station D DMA 2902 and the station S SMA 2802 are learned and a path is found. A retry limit can be set to prevent excessive numbers of tries.

To learn in both LAN and WAN modes, it is assumed that the end stations can "talk" so that the MAC addresses can be learned. Otherwise the existence of the end stations would not be known, Most end stations, at startup, transmit Ethernet frames for management or configurations reasons. If the end stations do not transmit frames at startup, either the switch can be configured to manually create the circuit, or the end station can be configured to transmit Ethernet frames via a higher level operation, such as IP level BOOTP, ARP or RARP requests.

It should be noted that an assumption made here is that end station locations in the topology are relatively static to prevent excessive overhead from learning. This is the same assumption as made in LAN mode for learning. If this is a non-desirable assumption, the algorithm can be optimized to learn only at every $n^{th}$ time it is seen, or learn at every $n^{th}$ frame. All of these optimizations have other repercussions, such as in the case of learning on every $n^{th}$ frame, if a station transmits frames at every $n^{th}$ time interval, it will never be learned. This optimization will also make time to learn longer. Also, it should be noted that the invention is not restricted to these optimizations. Other optimizations can also be used to balance the load on the higher layers.

Semi-automatic WAN mode circuits are set up in a similar manner to an automatically setup WAN mode circuit, except that the SMA and DMA is provided by configuration. The two endpoints remain fixed, but the circuit path taken to connect the two endpoints is automatically set up based on routing from the routing application.

Figure 3:
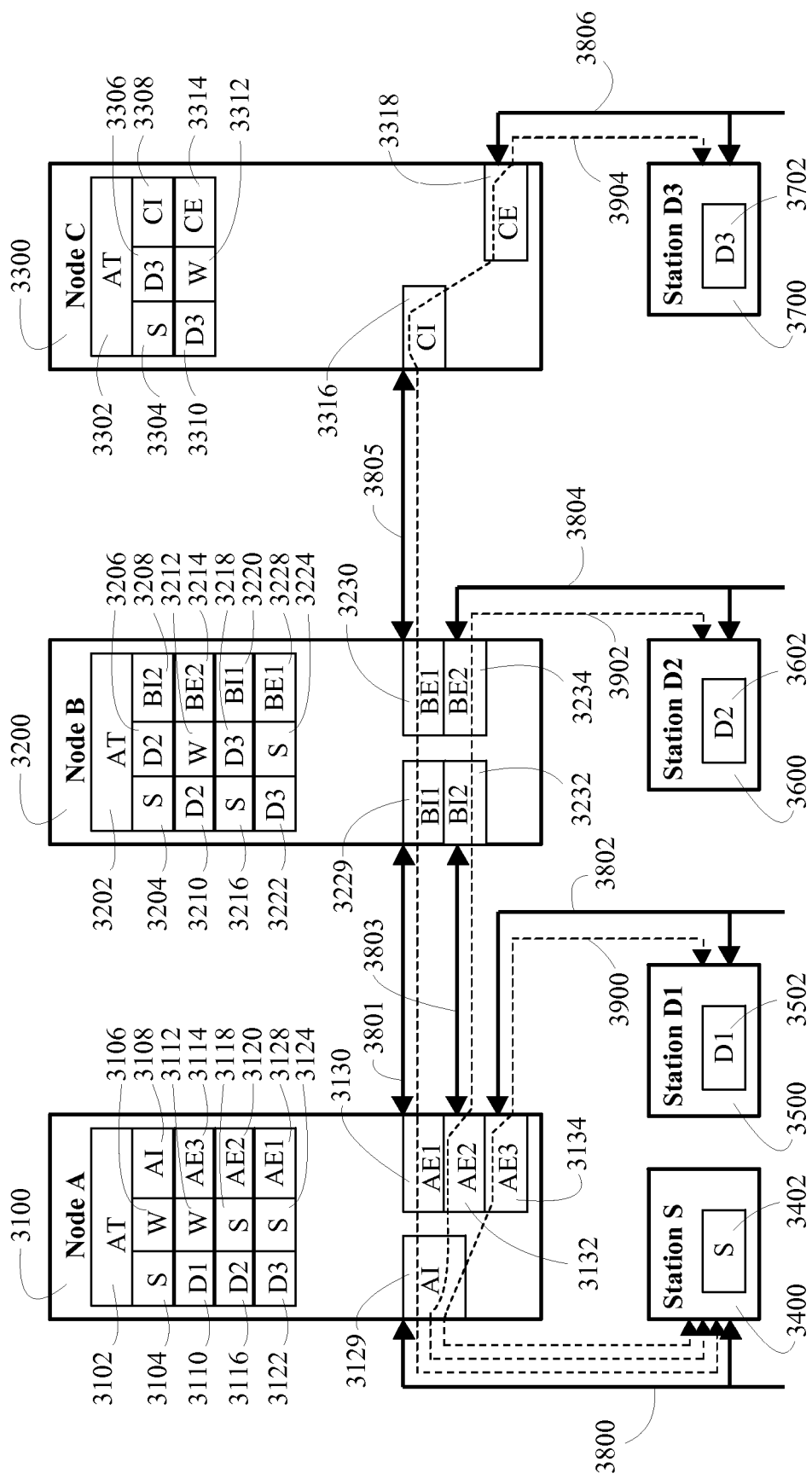
FIG. 3 is a diagrammatic illustration of multiple Ethernet MAC circuit setups according to another embodiment of the present invention.

FIG. 3 shows a multiple Ethernet MAC circuit setup. Three MAC circuits, a first circuit 3900, a second circuit 3902, and a third circuit 3904 extend from a source station S 3400 to a first destination station D1 3500, a second destination station D2 3600, and a third destination station D3 3700. The first circuit 3900 is routed through switch node A 3100 ingress port AI 3129 to egress port AE3 3134. The second circuit 3902 is routed through switch node A 3100 ingress port AI 3129 to egress port AE2 3132, to switch node B 3200 ingress port BI2 3232, to egress port BUG 3234. The third circuit 3904 is routed through switch node A 3100 ingress port AI 3129, to egress port AE1 3130, to switch node B 3200 ingress port BI1 3229, to egress port BE1 3230, to switch node C 3300 ingress port CI 3316, and to egress port CE 3318. The source station S 3400 is on Ethernet segment 3800; the destination station D1 3500 is on Ethernet segment 3802; the destination station D2 3600 is on Ethernet segment 3804; and the destination station D3 3700 is on Ethernet segment 3806. The Ethernet segment 3800 is connected to node A 3100 ingress port AI 3129; and the Ethernet segment 3802 is connected to node A 3100 egress port AE3 3134. The node A 3100 egress port AE1 3130 connects to node B 3200 port BI1 3229 along segment 3801; and the node A 3100 egress port AE2 3132 connects to node B 3200 ingress port BI2 3232 along segment

3801 The Ethernet segment 3804 is connected to node B 3200 egress port BE2 3234. The node B 3200 egress port BE1 3230 connects to node C 3300 ingress port CI 3316 along segment 3805. The Ethernet segment 3806 is connected to node C 3300 egress port CE 3318.

Each node A 3100, B 3200, and C 3300 maintains an Address Table in the form of first AT 3102, second AT 3202, and third AT 3302 that contain the AT entries. Each AT entry has three fields, the destination MAC address, source MAC address and the port ID to forward the matching frame to. The destination MAC addresses are S 3104, D1 3110, D2 3116, D3 3122, S 3204, D2 3210, S 3216, D3 3222, S 3304, and D3 3310. The source MAC addresses are W 3106, W 3112, S 3118, S 3124, D2 3206, W 3212, D3 3218, S 3224, D3 3306, and W 3312. The port IDs are AI port ID 3108, AE3 port ID 3114, AE2 port ID 3120, AE1 port ID 3128, BI2 port ID 3208, BE2 port ID 3214, BI1 port ID 3220, BE1 port ID 3228, CI port ID 3308, and CE port ID 3314.

In FIG. 3, three circuits are set up between one source station S 3400 and three destination stations, the first station D1 3500, the second station D2 3600, and the third station D3 3700. Each of these circuits shows an incremental functionality. The circuits are set up in the same process as described in the base circuit case of FIG. 2. The frame flow also occurs in the same manner as shown in FIG. 2. The circuit 3900 connects to station 5 3400 and station D1 3500 using path node A 3100 port A1 3129 to port AE3 3134. The circuit 3900 is established by the entries in node A 3100 Address Table 3102. The entries associated with this circuit have values S 3104, W 3106, and AI 3108, and D1 3110, W 3112, and AE3 3114. The circuit 3902 connects station S 3400 to station D2 3600 using path node A 3100 port AI 3129 to port AE2 3132, and node B 3200 port BI2 3232 to port BE2 3234. The circuit 3902 on node A 3100 establishes the corresponding AT 3102 entries with values S 3104, W 3106, and AI 3108, and D2 3116, S 3118, and AE2 3120. The circuit 3902 on node B 3200 establishes the corresponding AT 3202 entries with values S 3204, D2 3206, and BI2 3208, and D2 3210, W 3212, and BE2 3214. The circuit 3904 connects station S 3400 to station D3 3700 using path node A 3100 port AI 3129 to port AE1 3130, node B 3200 port BI1 3229 to port BE1 3230, and node C 3300 port CI 3316 to port CE 3318. The circuit 3904 on node A 3100 establishes the corresponding AT 3102 entries with values S 3104, W 3106, and A1 3108, and D3 3122, S 3124, and AE1 3128. The circuit 3904 on node B 3200 establishes the corresponding AT 3202 entries with values S 3216, D3 3218, and BI1 3220, and D3 3222, S 3224, and BE1 3228. The circuit 3904 on node C 3300 establishes the corresponding AT 3302 entries with values S 3304, D3 3306, and C1 3308, and D3 3310, W 3312, and CE 3314.

Above sections describe a base circuit setup where the circuit is established between SMA and DMA endpoints. For optimization and convenience, it can be desirable to set up circuits based on source and destination port endpoints instead. This makes it possible to not have to create individual MAC circuits. Often, there is a need to provide transparent LAN bridging over the MAN/WAN networks to connect two separate LAN networks. In this case, because all the MAC traffic travels from one port to the other, some optimizations are possible for reducing computational and resource overhead. These are sometimes also referred to as Ethernet Private Lines, or transparent LAN bridging. Because the MAN/WAN circuit looks like an Ethernet link to the end user, this circuit type is called a MAC link circuit. As with a base MAC circuit, link circuits can be set up "manually", "semi-automatically", or "automatically", based on configuration. To support functionality in "automatic" mode, the source port may also need to have a configuration indicating that it is a tunnel port so that all the frames received on the source port are sent over the link circuit, instead of trying to create base circuits for every source and destination MAC address pair. The destination port can be configured or it can be set up automatically by discovering the first Ethernet frames DMA's destination port.

Two approaches for implementing an Ethernet MAC link circuit are described below. The first approach involves a method wherein the source and destination port endpoints with the configured or calculated path is used to set up one link circuit through the network. Every other SMA and DMA base MAC circuit is then set up using the link circuit setup. This is conceptually equivalent to tunneling many base MAC circuits through the link circuit, and will be referred to as the circuit tunneling method.

A second approach involves the SMA and DMA of the port endpoints along with the configured or calculated path being used to set up one link circuit through the network. The MAC port hardware can be extended to provide new support for sending Ethernet over Ethernet. The MAC hardware requires maintaining the destination end point's port's MAC address DMA. This is configured at circuit setup. In this configuration, when a frame is received on the port end point of the circuit, the frame is encapsulated into an Ethernet frame using as a destination address the above-configured DMA and source as the receiving ports MAC address SMA. Ethernet frames are then tunneled over the link circuit using the SMA and DMA MAC circuit. This method will be referred to as the frame tunneling method.

Both implementations can coexist in the same network. Only the link circuit invokes routing to get the path and signaling to set up the circuit. All tunneled circuits instead propagate over the same path. Hence, there is less routing overhead. In the circuit tunneling method, every tunneled MAC circuit consumes an entry in the AT, and some circuit setup overhead is required for every tunneled MAC circuit setup. The link circuit maintains a list of all the MAC addresses and their destination ports all through the path of the circuit and setup up the AT entries for all the tunneled base circuits along the path. Messaging occurs between the signaling application instances on all the nodes/stations along the circuit path. The advantage is that it does not require any changes to the standard MAC hardware. Individual base circuits can be controlled individually.

In the frame tunneling method, the MAC hardware is extended to support sending Ethernet frames inside an Ethernet frame. This method is backward incompatible and proprietary because to encapsulate an Ethernet frame within an Ethernet frame the encapsulating Ethernet frame type must be larger than the maximum size Ethernet frame or it would require fragmentation. Fragmentation is relatively expensive in terms of overhead and performance. Current Ethernet framing does not support fragmentation. Extending the MAC hardware to support larger Ethernet framing is relatively easier to implement, but is not standard. All the ports along the circuit path may have to be set up into the frame tunneling mode.

The method of the frame tunneling consumes only two AT entries, instead of two AT entries for each base MAC circuit being tunneled. AT hardware support can be costly. Individual control of base MAC circuits is lost due to encapsulation. This method has only one circuit setup overhead and no additional inter-signaling message overhead.

In the circuit tunneling method, the architecture supports the circuit endpoints being an ingress or egress port on a switch node. The architecture also supports base circuits and circuit tunneling link circuits routed over the same port. A configurable option is necessary to specify whether the base circuit should use the link circuit. An example instance of this is where a sub-rate circuit tunneling link circuit has been set up between two ports and there is bandwidth available between the two ports to route other base circuits not being tunneled.

If a circuit has been configured to use the link circuit it will only be able to enter and leave the link circuit at the link circuits end points. In other words, circuits cannot be added to or dropped from the link circuit at arbitrary points along the path.

FIGS. 4, 4A, 4B, and 4C show a circuit tunneling link circuit setup. A circuit tunneling link circuit 4700 is provided with a first end point being node A 4100 ingress port AI 4104 and a second end point being node C 4300 ingress port CI 4304. Individual tunneled circuits break out to individual ports. A first circuit section 4702 is set up on node C 4300 ingress port CI 4304 to egress port CE1 4306. A second circuit section 4704 is set up on node C 4300 ingress port CI 4304 to egress port CE2 4308. A third circuit section 4706 is set up on node C 4300 ingress port CI 4304 to egress port CE3 4310. A first source station S1 440, a second source station S2 4404, and a third source station S3 4408 are on Ethernet segment 4600. A first destination station D1 4500 is on Ethernet segment 4602. A second destination station D2 4504 is on Ethernet segment 4604. A third destination station D3 4508 is on Ethernet segment 4606. The Ethernet segment 4600 is connected to node A 4100 ingress port AI 4104. The Ethernet segment 4602 is connected to node C 4300 egress port CE1 4306. The Ethernet segment 4604 is connected to node C 4300 egress port CE2 4308. The Ethernet segment 4606 is connected to node C 4300 egress port CE2 4310. The node A 4100 egress port AE 4106 connects, via segment 4601, to node B 4200 ingress port BI 4204. The node B 4200 egress port BE 4206 connects, via segment 4603, to node C 4300 ingress port CI 4304. Each node 4100, 4200, and 4300 maintain an Address Table in the form of first AT 4102, second AT 4202, and third AT 4302.

Figure 4:
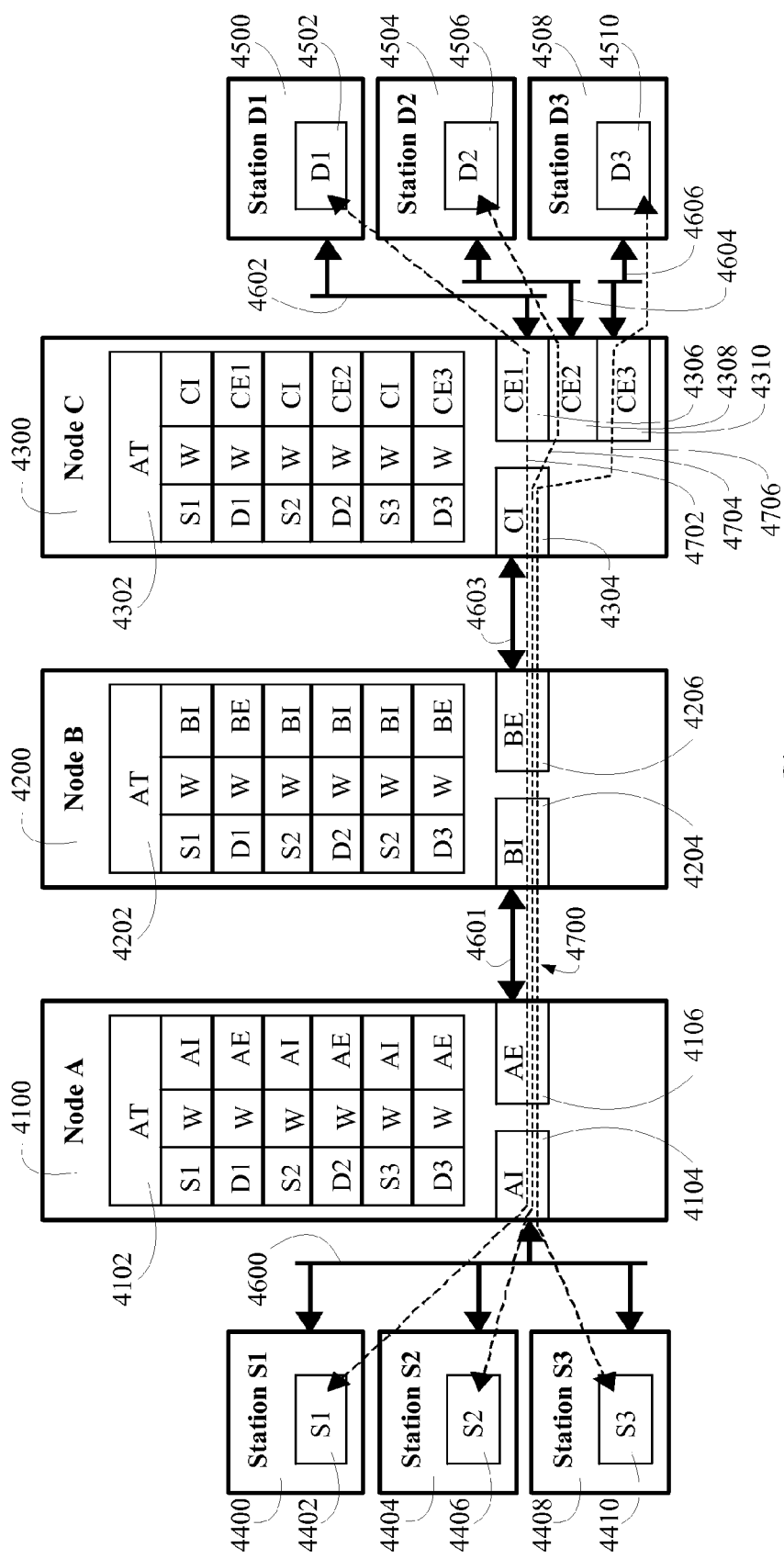
FIG. 4 is a diagrammatic illustration of a circuit tunneling Ethernet MAC link circuit setup according to one embodiment of the present invention.

FIG. 4 further shows a circuit tunneling link circuit setup between three source stations a first source station S1 4400, a second source station S2 4404, and a third source station S3 4408, and three destination stations, a first destination station D1 4500, a second destination station D2 4504, and a third destination station D3 4508. The circuits are set up in the same process as described in the base circuit case of FIG. 2. The frame flow also occurs in the same manner as shown in FIG. 2. Link circuit 4700 carries three individual base circuits from end point node A 4100 port AI 4104 to node C 4300 port CI 4304. From this end point, the individual circuit segments segment 4702, segment 4704, and segment 4706, continue to different end points for the final destinations. The station S1 4400 connects to station D1 4500 by a tunneled circuit using path node A 4100 port AI 4104 to port AE 4106, node B 4200 port BI 4204 to port BE 4206, and node C 4300 port CI 4304 to port CE1 4306. The link circuit 4700 on node A 4100 establishes the corresponding AT 4102 entries with values S1 4110, W 4112, and AI 4114, and DI 4120, W 4122, and AE 4124. The link circuit 4700 on node B 4200 establishes the corresponding AT 4202 entries with values S1 4210, W 4212, and BI 4214, and D1 4220, W 4222, and BE 4224. The circuit segment 4702 on node C 4300 establishes the corresponding AT 4302 entries with values S1 4310, W 4312, and CI 4314, and D1 4320, W 4322, and CE1 4324. The station S2 4404 connects to station D2 4504 by a tunneled circuit using path node A 4100 port AI 4104 to port AE 4106, node B 4200 port BI 4204 to port BE 4206, and node C 4300 port CI 4304 to port CE2 4308. The link circuit 4700 on node A 4100 establishes the corresponding AT 4102 entries with values S2 4130, W 4132, and AI 4134, and D2 4140, W 4142, and AE 4144. The link circuit 4700 on node B 4200 establishes the corresponding AT 4202 entries with values S2 4230, W 4232, and BI 4234, and D2 4240, W 4242, and BE 4244. The circuit segment 4704 on node C 4300 establishes the corresponding AT 4302 entries with values S2 4330, W 4332, and CI 4334, and D2 4340, W 4342, and CE2 4344. The station S3 4408 connects to station D3 4508 by a tunneled circuit using path node A 4100 port AI 4104 to port AE 4106, node B 4200 port BI 4204 to port BE 4206, and node C 4300 port CI 4304 to port CE3 4310. The link circuit 4700 on node A 4100 establishes the corresponding AT 4102 entries with values S3 4150, W 4152, and AI 4154, and D3 4160, W 4162, and AE 4164. The link circuit 4700 on node B 4200 establishes the corresponding AT 4202 entries with values S2 4250, W 4252, and BI 4254, and D3 4260, W 4262, and BE 4264. The circuit segment 4706 on node C 4300 establishes the corresponding AT 4302 entries with values S3 4350, W 4352, and CI 4354, and D3 4360, W 4362, and CE3 4364.

Figure 5:
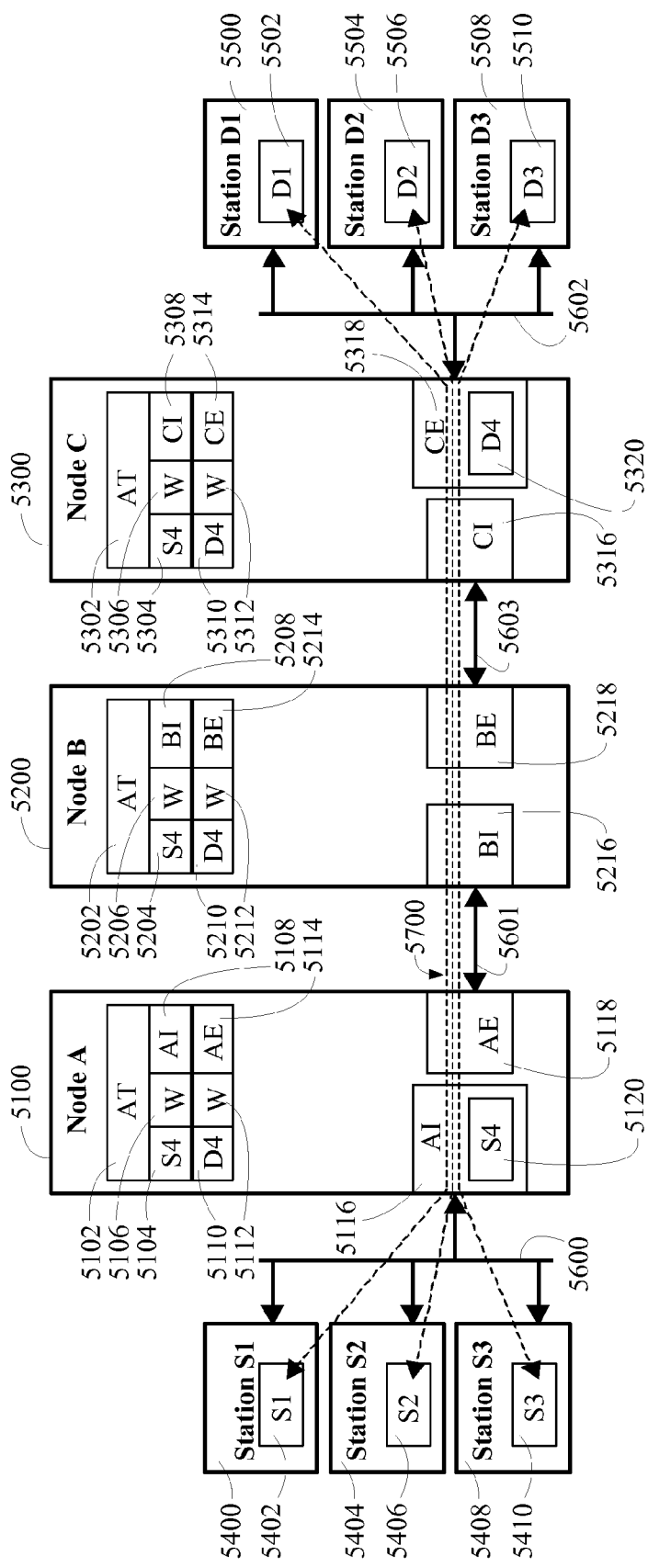
FIG. 5 is a diagrammatic illustration of a frame tunneling Ethernet MAC link circuit setup according to one embodiment of the present invention.

FIG. 5 shows a frame tunneling link circuit setup. It shows a frame tunneling link circuit 5700 with one end point being node A 5100 port AI 5116 and the other being node C 5300 port CE 5318. A first source station Si 5400, a second source station S2 5404, and a third source station S3 5408 are on Ethernet segment 5600. A first destination station D1 5500, a second destination station D2 5504, and a third destination station D3 5508 are on Ethernet segment 5602. The node A 5100 egress port AE 5118 connects, via segment 5601, to node B 5200 ingress port BI 5216. The node B 5200 egress port BE 5218 connects, via segment 5603, to node C 5300 ingress port CI 5316. The node A 5100 ingress port AI 5116 has a MAC address S4 5120. The node C 5300 egress port CE 5318 has MAC address D4 5320.

Each of node A 5100, node B 5200, and node C 5300 maintains an Address Table in the form of first AT 5102, second AT 5202, and third AT 5302 that contain AT entries. Each AT entry has three fields, the DMA, SMA, and port ID to forward the matching frame. The destination MAC addresses are S4 5104, D4 5110, S4 5204, D4 5210, S4 5304, and D4 5310. The source MAC addresses are W 5106, W 5112, W 5206, W 5212, W 5306, and W 5312. The port IDs are AI port ID 5108, AE port ID 5114, BI port ID 5208, BE port ID 5214, CI port ID 5308, and CE port ID 5314. Note that in this case the MAC address of the ingress and egress ports of the Link circuit are used to construct the circuit.

In FIG. 5 a frame tunneling link circuit setup between three source stations a first source station S1 5400, a second source station S2 5404, and a third source station S3 5408, and three destination stations a first destination station D1 5502, a second destination station D2 5504, and a third destination station D3 5508. The circuits are set up in the same process as described in the base circuit case of FIG. 2. The frame flow also occurs in the same manner as show in FIG. 2. The link circuit 5700 carries the three individual base circuits from end point node A 5100 port AI 5116 to node C 5300 port CE 5318. The station S1 5400 connects to station D1 5500 by a tunneled frames using path node A 5100 port AI 5116 to port AE 5118, node B 5200 port BI 5216 to port BE 5218, and node C 5300 port CI 5216 to port CE 5318. The link circuit 5700 on node A 5100 establishes the corresponding AT 5102 entries with values S4 5104, W 5106, and AI 5108, and D4 5110, W 5112, and AE 5114. The link circuit 5700 on node B 5200 establishes the corresponding AT 5202 entries with values S4 5204, W 5206, and BI 5208, and D4 5210, W 5212, and BE 5214. The link circuit 5700 on node C 5300 establishes the corresponding AT 5302 entries with values S4 5304, W 5306, and CI 5308, and D4 5310, W 5312, and CE 5314.

Figure 6:
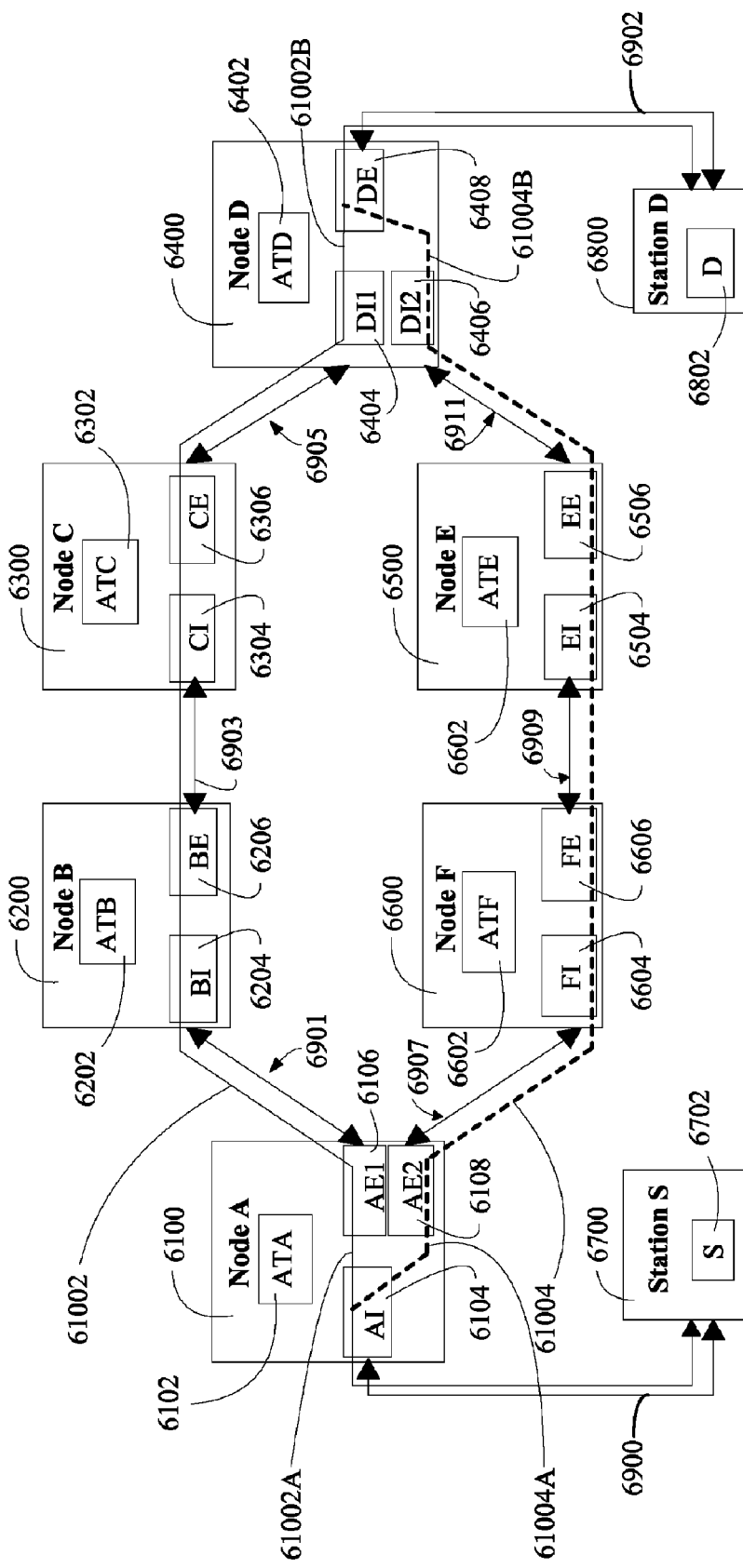
FIG. 6 is a diagrammatic illustration of a path APS protected Ethernet MAC circuit setup according to one embodiment of the present invention.

FIG. 6 shows a path Automatic Protection Switching (APS) protected Ethernet MAC circuit setup. In SDH, similar types of circuits are also referred to as SNC-P circuits. In SDH/SONET, similar circuits are referred to as diversely routed circuits. FIG. 6 shows a working circuit 61002 and protect circuit 61004 between end points node A 6100 port A1 6104 and node D 6400 port DE 6408. The setup shows that the working circuit 61002 is active. This is shown by the connection 61002A between node A 6100 port AI 6104 and port AE1 6106 and connection 61002B between node D 6400 port DI1 6404 and port DE 6408 in solid lines. The setup shows the protect connection 61004A between node A 6100 port AI 6104 and port AE2 6108 and connection 61004B between node D 6400 DI2 6406 and port DE 6408 in dashed lines. Station S 6700 is on Ethernet segment 6900. Station D 6800 is on Ethernet segment 6902. The Ethernet segment 6900 is connected to node A 6100 port AI 6104. The Ethernet segment 6902 is connected to node D 6400 port DE 6408. The node A 6100 port AE1 6106 connects via segment 6901 to node B 6200 port BI 6204. Node B 6200 port BE 6206 connects via segment 6903 to node C 6300 port CI 6304. Node C 6300 port CE 6306 connects via segment 6905 to node D 6400 port DI1 6404. Node A 6100 port AE2 6108 connects via segment 6907 to node F 6600 port FI 6604. Node F 6600 port FE 6606 connects via segment 6909 to node E 6500 port EI 6504. Node E 6500 port EE 6506 connects via segment 6911 to node D 6400 port DI2 6406. Each node A 6100, B 6200, C 6300, D 6400, E 6500, and F 6600 maintains an Address Table ATA 6102, ATB 6202, ATC 6302, ATD 6402, ATE 6502, and ATF 6602, which are illustrated in more detail in FIGS. 7A, 7B, 7C, 7D, 7E, and 7F. Each AT entry has three fields, the destination MAC address, source MAC address, and the port ID, to forward the matching frame to.

FIG. 6 further shows one path APS protected circuit setup between the source station S 6700 and the destination station D 6800. FIGS. 7A, 7B, 7C, 7D, 7E, and 7F show the Address Tables of all the nodes. The working and protect circuits are set up using the same process as described in the base circuit case of FIG. 2. The frame flow also occurs in the same manner as shown in FIG. 2. The working circuit 61002 connects station S 6700 to station D 6800 using path node A 6100 port AI 6104 to port AE1 6106, node B 6200 port BI 6204 to port BE 6206, node C 6300 port CI 6304 to port CE 6306, and node D 6400 port DI1 6404 to port DE 6408. The working circuit 61002 on node A 6100 establishes the corresponding ATA 6102 entries with values S 7102, W 7104, and AI 7106, and D 7108, S 7110, and AE1 7112. The working circuit 61002 on node B 6200 establishes the corresponding ATB 6202 entries with values S 7202, D 7204, and BI 7206, and D 7208, S 7210, and BE 7212. The working circuit 61002 on node C 6300 establishes the corresponding ATC 6302 entries with values S 7302, D 7304, and CI 7306, and D 7308, S 7310, and C 7312. The working circuit 61002 on node D 6400 establishes the corresponding ATD 6402 entries with values S 7402, D 7404, and DU, 7406, and D 7414, S 7416, and DE 7418. The protect circuit 61004 connects station S 6700 to station D 6800 using path node A 6100 port AI 6104 to port AE2 6108, node F 6600 port FI 6604 to port FE 6606, node E 6500 port EI 6504 to port EE 6506, and node D 6400 port DI2 6406 to port DE 6408. The protect circuit 61004 on node A 6100 establishes the corresponding ATA 6202 entries with values S 7102, W 7104, and AI 7106, and D 7114, S 7116, and AE2 7118 (note this entry is in italics font to represent that it will be present only when protect is active). The protect circuit 61004 on node F 6600 establishes the corresponding ATF 6602 entries with values S 7602, D 7604, and FI 7606, and D 7608, S 7610, and FE 7612. The protect circuit 61004 on node E 6500 establishes the corresponding ATE 6502 entries with values S 7502, D 7504, and EI 7506, and D 7508, S 7510, and EE 7512. The protect circuit 61002 on node D 6400 establishes the corresponding ATD 6402 entries with values S 7408, D 7410, and D12 7412 (note this entry is in italics font to represent that it will be present only when protect is active) and D 7414, S 7416, and DE 7418.

Ethernet MAC APS Control frames provide support for SDH/SONET K/1K2 APS signaling protocol on Ethernet networks. The near end APS Controller can use the MAC APS Control frames to communicate with the far end APS controller during switchover and other APS operational requests. The far end APS controller, in turn, can use the MAC APS Control frames to communicate with the near end APS controller for switchover and other APS operational requests. An Ethernet MAC APS Control sublayer is provided for processing Ethernet MAC APS Control frames. The Ethernet MAC APS Control sublayer provides support for a MAC Client APS Controller to implement all of the SDH/SONET APS standard functionality.

For path APS to function correctly, when there is a failure detected by any port along the path, the port transmits to the two end point ports of the path protected circuits a MAC APS control protocol frame indicating the failure. When the end point ports receive the frame they initiate a switchover from working to protect circuit. The switchover occurs at the head end by switching the connection 61002A on node A 6100 between port AI 6104 and port AE1 6106 to the connection 61004A on node A 6100 between port AI 6104 and port AE2 6108. The switchover occurs at the tail end by switching the connection 61002B on node D 6400 between port DI1 6404 and port DE 6408 to the connection 61004B on node D 6400 between port DI2 6406 and port DE 6408. To enable the APS frames to reach the end point ports, circuits can also be set up to direct the APS frames to the end ports. The AT entry to forward frames destined for AI 6104 on node B 6200 is shown by AI 7214, W 7216, and BI 7218. The AT entry to forward frames destined for AI 6104 on node C 6300 is shown by AI 7314, W 7316, and CI 7318. The AT entry to forward frames destined for AI 6104 on node F 6600 is shown by AI 7614, W 7616, and DE 7618. The AT entry to forward frames destined for AI 6104 on node E 6500 is shown by AI 7514, W 7516, and EI 7518. The AT entry to forward frames destined for DE 6408 on node B 6200 is shown by DE 7220, W 7222, and BE 7224. The AT entry to forward frames destined for DE 6408 on node C 6300 is shown by DE 7320, W 7322, and CE 7324. The AT entry to forward frames destined for DE 6408 on node F 6600 is shown by DE 7620, W 7622, and FE 7624. The AT entry to forward frames destined for DE 6408 on node E 6500 is shown by DE 7520, W 7522, and EE 7524. Note that nodes A 6100 and D 6400 are located where the APS frames terminate so there are no address table entries for the APS frames.

The present invention provides full control of a network by providing a mechanism for setting up circuits. The implementation of the present invention is relatively more bandwidth efficient than LAN switches because it utilizes all links available between switch nodes for traffic. Each link between nodes can have different metrics, such as VPN, costs, and the like, compared with similar LAN Link Aggregation technology. In addition, there is no use of flooding in the data plane, which wastes bandwidth. The implementations of the present invention are backward compatible with Ethernet. The bridging of two Ethernet LANs using link circuits provides an efficient circuit setup. The present invention also does not require any explicit signaling circuit setup request, because the circuit setup can be automatically triggered using "WAN learning." The present invention is backward compatible with the Ethernet protocol and allows support for circuits. Therefore, a network upgrade is not required for all the Ethernet switches in a network, as some other technologies, such as Ethernet over Multiprotocol Label Switching (EoMPLS), require to gain any form of circuit/flow functionality.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

What is claimed is:

1. An Ethernet Media Access Control (MAC) Bridge device configured to establish Ethernet MAC circuit functionality for Ethernet networks, comprising:
    a MAC Bridge configured to support learning based on source MAC addresses to ingress port mapping stored by a higher layer routing application, a signaling application, or both, in a mapping database by request to establish an Ethernet MAC circuit;
    the MAC Bridge further configured to manage an Address Table (AT) having a plurality of AT entries to set up and manage the Ethernet MAC circuit, the plurality of AT entries having at least a destination MAC address field, a source MAC address field, and a port to forward frame to field;
    wherein the destination MAC address field and/or the source MAC address field is utilized to lookup an Ethernet frame destination MAC address and/or an Ethernet frame source MAC address and forward the Ethernet frame to a port in one of the plurality of AT entries to establish the Ethernet MAC circuit.

2. The Ethernet MAC Bridge device in claim 1, wherein the Ethernet MAC device is configurable to utilize multiple links between nodes.

3. The Ethernet MAC Bridge device in claim 1, wherein the Ethernet MAC device is configurable with a control plane to manage the network and circuit setup.

4. The Ethernet MAC Bridge device in claim 1, wherein a control plane is distributed over the network.

5. The Ethernet MAC Bridge device in claim 1, wherein a control plane is centralized in the network.

6. The Ethernet MAC Bridge device in claim 1, wherein a control plane comprises a higher layer signaling application.

7. The Ethernet MAC Bridge device in claim 1, wherein a control plane comprises a higher layer management application.

8. The Ethernet MAC Bridge device in claim 1, wherein the higher layer signaling application is implemented using Multiprotocol Label Switching (MPLS), Differentiated Services (DiffServ), Integrated Services (IntServ), Resource Reservation Setup Protocol (RSVP), or other signaling methods to manage and set up circuits.

9. The Ethernet MAC Bridge device in claim 1, wherein a control plane comprises a higher layer routing application.

10. The Ethernet MAC Bridge device in claim 1, wherein the higher layer routing application is implemented using Routing Information Protocol Version 1 (RIP 1), Routing Information Protocol Version 2 (RIP2), Open Shortest Path First (OSPF), Interior Gateway Routing Protocol (IGRP), Extended Interior Gateway Routing Protocol (EIGRP), or other routing methods to manage and set up circuits.

11. The Ethernet MAC Bridge device in claim 1, wherein the circuit is set up based on a plurality of configurable parameters in traffic attributes.

12. The Ethernet MAC Bridge device in claim 1, wherein the circuit is set up based on a plurality of Ethernet frame fields.

13. The Ethernet MAC Bridge device in claim 1, wherein the forwarding based on a plurality of configurable parameters in traffic attributes.

14. The Ethernet MAC Bridge device in claim 1, wherein the forwarding is based on a plurality of Ethernet frame fields.

15. The Ethernet MAC Bridge device in claim 1, wherein the forwarding is based on a plurality of Address Table fields.

16. The Ethernet MAC Bridge device in claim 1, wherein the Address Table (AT) entry field is configured to be a wildcard match.

17. The Ethernet MAC Bridge device in claim 1, wherein the Ethernet MAC device is configurable in dual mode to support LAN mode and WAN mode.

18. The Ethernet MAC Bridge device in claim 1, wherein the MAC sublayer provides a hardware interface and a software interface configurable to enable/disable Spanning Tree Protocol (STP).

19. The Ethernet MAC Bridge device in claim 1, wherein the MAC sublayer provides a hardware interface and a software interface configurable to enable/disable Flooding.

20. The Ethernet MAC Bridge device in claim 1, wherein the MAC sublayer provides a hardware interface and a software interface configurable to enable/disable LAN Learning.

21. The Ethernet MAC Bridge device in claim 1, wherein the MAC sublayer provides a hardware interface and a software interface configurable to enable/disable WAN Learning.

22. In an Ethernet protocol network of Ethernet MAC Bridge devices, the network having at least one node having at least two ports, a method of setting up an Ethernet MAC circuit, comprising:
    receiving a frame on at least one port of the at least one node;
    learning source MAC addresses to port mapping relating to the frame received on the at least one port using a higher layer routing and/or signaling application to establish the Ethernet MAC circuit, wherein the step of learning comprises:
        creating the source MAC addresses to port mapping and generating an interrupt at a MAC sublayer;
        processing the interrupt and queuing a request to the higher layer routing, signaling, or management application; and
        the higher layer routing, signaling, or management application storing the source MAC addresses to port mapping in a mapping database;
    using a destination MAC address and a source MAC address of the frame to find a path;
    using the path to set up the Ethernet MAC circuit; and
    forwarding a plurality of Ethernet frames along the circuit.

23. The method according to claim 22, wherein the Ethernet MAC device is configurable to utilize multiple links between nodes.

24. The method according to claim 22, wherein a control plane of the Ethernet MAC device manages the network and circuit set up.

25. The method according to claim 22, wherein a control plane of the Ethernet MAC device is distributed over the network.

26. The method according to claim 22, wherein a control plane of the Ethernet MAC device is centralized in the network.

27. The method according to claim 22, wherein a control plane of the Ethernet MAC device comprises a higher layer signaling application.

28. The method according to claim 22, wherein a control plane of the Ethernet MAC device comprises a higher layer routing application.

29. The method according to claim 22, wherein a control plane of the Ethernet MAC device comprises a higher layer management application.

30. The method according to claim 22, wherein the circuit is set up based on a plurality of configurable parameters in traffic attributes.

31. The method according to claim 22, wherein the circuit is set up based on a plurality of Ethernet frame fields.

32. The method according to claim 22, wherein the step of forwarding is based on a plurality of configurable parameters in traffic attributes.

33. The method according to claim 22, wherein the step of forwarding is based on a plurality of Ethernet frame fields.

34. The method according to claim 22, wherein the step of forwarding is based on a plurality of Address Table fields.

35. The method according to claim 22, wherein an Address Table (AT) entry field is configured to be a wildcard match.

36. The method according to claim 22, wherein the Ethernet MAC device is configurable in dual mode to support LAN mode and WAN mode.

37. The method according to claim 22, wherein the circuit is provided between two Ethernet End Stations.

38. The method according to claim 22, wherein the circuit is provided between two Ethernet LANs and is connected using circuit tunneling.

39. The method according to claim 22, wherein the circuit is provided between two Ethernet LANs and is connected using frame tunneling.

40. The method according to claim 22, wherein the circuit is provided between two Ethernet LANs and is connected using Ethernet in Ethernet encapsulation.

41. The method according to claim 22, wherein the circuit is provided between a single Ethernet LAN and a plurality of Ethernet LANs, and is connected using circuit tunneling.

42. The method according to claim 22, wherein the circuit is provided between a single Ethernet LAN and a plurality of Ethernet LANs, and is connected using Frame tunneling.

43. The method according to claim 22, wherein the circuit provided between a single Ethernet LAN and a plurality of Ethernet LANs, and is connected using Ethernet in Ethernet encapsulation.

44. In an Ethernet protocol network of Ethernet MAC Bridge devices, a method of setting up an Ethernet MAC circuit, comprising the steps of:
- a MAC Bridge supporting learning based on a control plane to establish the Ethernet MAC circuit;
- the MAC Bridge setting up and managing the circuit based on the control plane; and
- wherein the MAC Bridge can be configured to set up circuits to use multiple links between the MAC Bridge devices.

45. The method according to claim 44, wherein the Ethernet MAC device is configurable with a control plane to manage the network and circuit setup.

46. The method according to claim 44, wherein the Ethernet MAC device is configurable to utilize multiple links between nodes.

47. The method according to claim 44, wherein the circuit is provided between two Ethernet End Stations.

48. The method according to claim 44, wherein the circuit is provided between two Ethernet LANs.

* * * * *

UNITED STATES PATENT AND TRADEMARK OFFICE
CERTIFICATE OF CORRECTION

| | |
|---|---|
| PATENT NO. | : 7,920,561 B2 |
| APPLICATION NO. | : 12/731944 |
| DATED | : April 5, 2011 |
| INVENTOR(S) | : Rumi S. Gonda |

It is certified that error appears in the above-identified patent and that said Letters Patent is hereby corrected as shown below:

In the Claims:

Column 22, line 12 (claim 13, line 2) the word -- is -- should be added after "forwarding"

Signed and Sealed this
Seventh Day of February, 2012

David J. Kappos
*Director of the United States Patent and Trademark Office*